United States Patent [19]

Hideo

[11] Patent Number: 5,218,447
[45] Date of Patent: Jun. 8, 1993

[54] METHOD AND APPARATUS FOR IDENTIFYING THE REPRODUCTION MODE OF A VIDEO TAPE RECORDER

[75] Inventor: Satomi Hideo, Gunma, Japan

[73] Assignee: Sanyo Electric Co., Ltd., Japan

[21] Appl. No.: 610,834

[22] Filed: Nov. 8, 1990

[30] Foreign Application Priority Data

Nov. 13, 1989 [JP] Japan .................. 1-294718

[51] Int. Cl.[5] .............................................. H04N 9/79
[52] U.S. Cl. ............................................... 358/312
[58] Field of Search ....................................... 358/312

[56] References Cited

U.S. PATENT DOCUMENTS

| 4,007,485 | 2/1977 | Sato ............................ 358/8 |
| 4,084,176 | 4/1978 | Trost ........................... 358/8 |
| 4,283,737 | 8/1981 | Nikami ......................... 358/8 |
| 4,668,998 | 5/1987 | Aoki ........................... 358/312 |
| 4,851,930 | 7/1989 | Fukuda et al. ................. 358/312 |

FOREIGN PATENT DOCUMENTS 57-009184 1/1982 Japan .
58-040993 3/1983 Japan .
60-209904 10/1985 Japan .
63-079494 4/1988 Japan .

Primary Examiner—Roy N. Envall, Jr.
Assistant Examiner—Jennifer L. Hazard
Attorney, Agent, or Firm—Peter L. Michaelson; Raymond R. Moser, Jr.

[57] ABSTRACT

A reproduction mode identification circuit (1) is responsive to a horizontal synchronizing signal and a color rotary pulse for identifying whether the reproduction state of a double azimuth 4 head system VTR is the search reproduction or not of the SP mode. The reproduction mode identification circuit (1) provides a mode identification signal in response to whether a half period of the color rotary pulse is greater or not than a predetermined value smaller than the vertical synchronizing period.

16 Claims, 9 Drawing Sheets

METHOD AND APPARATUS FOR IDENTIFYING THE REPRODUCTION MODE OF A VIDEO TAPE RECORDER

BACKGROUND OF THE INVENTION

Field of the Invention

The present invention relates to reproduction mode identification devices and a method of reproduction mode identification, and more particularly, to a device and method for identifying whether the reproduction state of a double azimuth 4 head system video tape reproduction device is the search reproduction, i.e., a high speed reproduction mode or the standard reproduction mode.

Description of the Background Art

Figure 1:
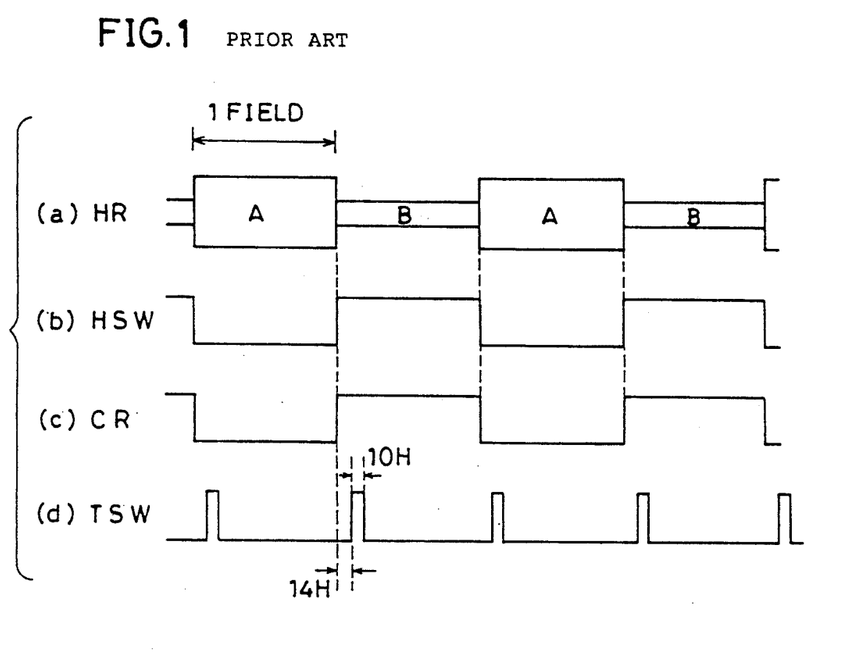
FIG. 1 is a waveform of various signals resulting from standard reproduction.

In general, heads associated with each channel in a video tape recorder (hereinafter referred to as a VTR) differ from one another. Channel A is reproduced by head A, whereas channel B is reproduced by head B. The level of the head reproduction chrominance signal HR of channel A is different to that of channel B, as shown in FIG. 1 (a). In order to eliminate the difference in level between channels during reproduction, automatic gain control [AGC (or ACC: automatic chroma control)] is carried out with respect to head reproduction chrominance signal HR of FIG. 1 (a). A long time constant (response sensitivity) of the AGC is generally set for the purpose of improving the S/N (signal-to-noise ratio). In such cases, the level difference between channels is not absorbed sufficiently. This results in color flickers on the image screen.

A technique is known where a time constant switching signal TSW shown in FIG. 1 (d) is created in accordance with the edge of a head switching signal HSW (control signal) shown in FIG. 1 (b). When time constant switching signal TSW is at the H level, the time constant of the AGC is shortened to improve the response. This prevents the generation of color flickers.

The circuit for carrying out the above mentioned process is generally incorporated in an integrated circuit (IC). That IC is provided with pins for receiving the head switching signal HSW.

Figure 2:
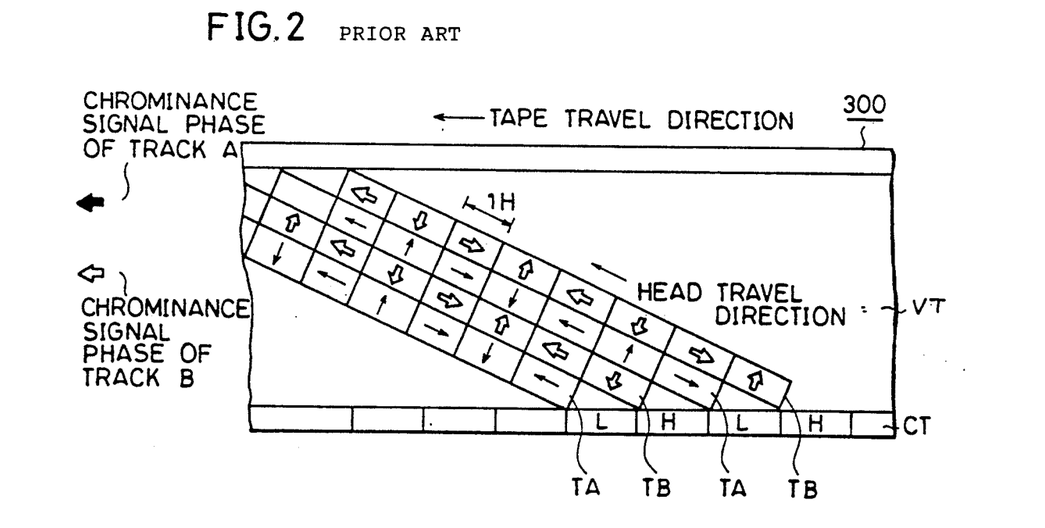
FIG. 2 is a diagram for explaining the phase shift system.

There is a PS (phase shift) system, as shown in FIG. 2, to eliminate crosstalk between head A and head B.

Referring to FIG. 2, a video track VT and a control track CT are formed in a video tape 300. In video track VT, A track TA is recorded by head A, whereas B track TB is recorded by head B. Control signals are recorded in control track CT.

The carrier chrominance signal of A track TA is recorded so that its phase is advanced 90° every 1H (horizontal scanning period). The carrier chrominance signal of B track TB is recorded so that its phase is delayed 90° every 1H. This cancels the crosstalk components.

A color rotary pulse is used for specifying whether the phase of the carrier chrominance signal is to be advanced or delayed. In a 2 head system VTR, the color rotary pulse CR is the same as the head switching signal HSW, as shown in FIG. 1 (c). The color rotary pulse CR can therefore be used as a substitute for the head switching signal HSW. This means that the number of pins in the IC can be reduced. Recently, there are some ICs that do not have pins for receiving the head switching signal HSW.

Regarding double azimuth 4 head system VTRs, the color rotary pulse is not the same as the head switching signal in the multiple speed (search) reproduction of the standard play (SP) mode, as will be explained hereinafter. A double azimuth 4 head system VTR is described with reference to FIGS. 3-6.

Figure 3:
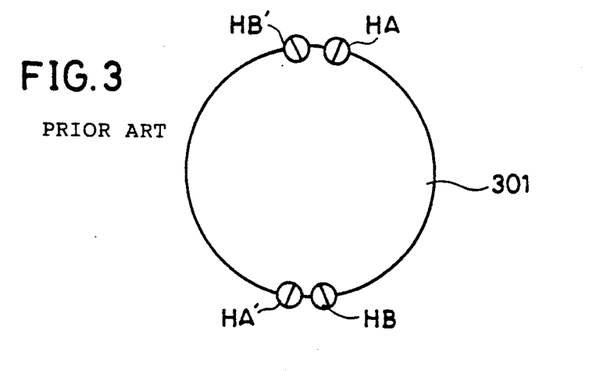
FIG. 3 depicts a video head of a double azimuth 4 head system.

Referring to FIG. 3, a rotary drum 301 is provided with A' head HA', B' head HB', A head HA, and B head HB. A head HA and A' head HA' have the same azimuth angle. B head HB and B' head HB' have the same azimuth angle.

Figure 4:
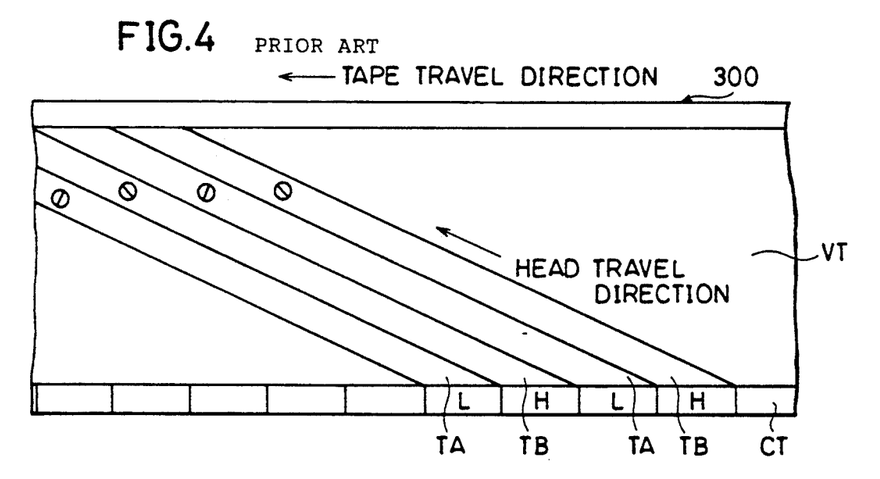
FIG. 4 is a diagram for explaining the standard reproduction of the SP mode in a double azimuth 4 head system VTR.

During standard reproduction (reproduction by standard speed) of the SP mode, A track TA is traced by A head HA and B track TB is traced by B head HB, as shown in FIG. 4. A' head HA' and B' head HB' are not used in this case.

Figure 5:
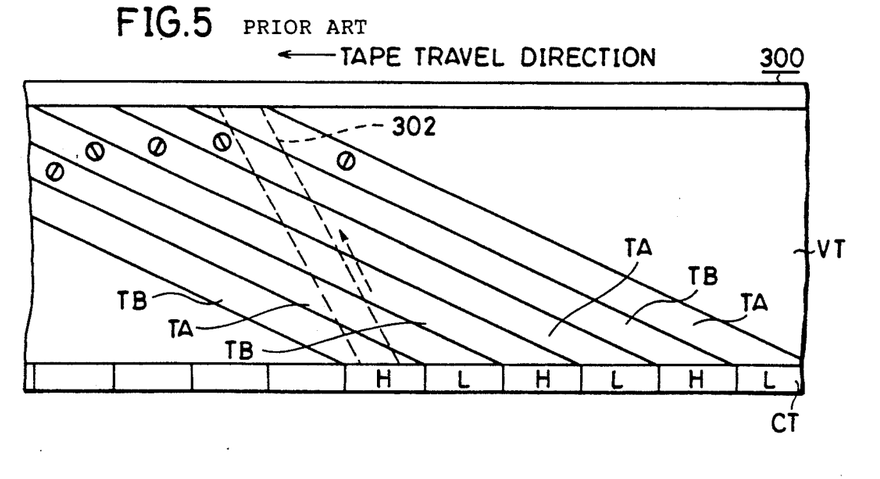
FIG. 5 is a diagram for explaining the search reproduction of the SP mode in a double azimuth 4 head system VTR.
Figure 6:
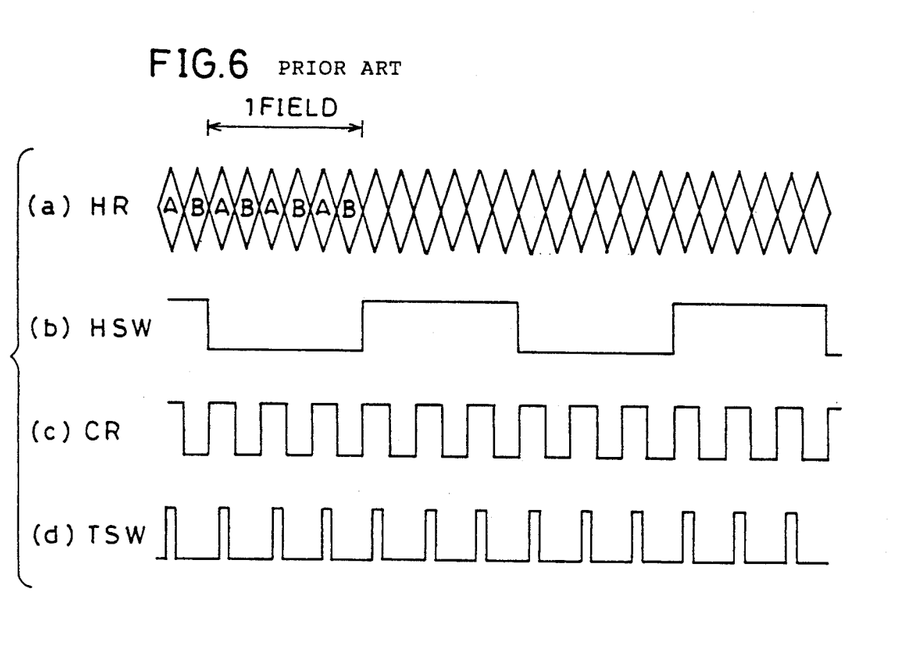
FIG. 6 is a waveform of various signals resulting from search reproduction of the SP mode in a double azimuth 4 head system VTR.

In the search reproduction of the SP mode, i.e., a high speed reproduction mode, video track VT is traced as shown by the dashed line 302 of FIG. 5. In 1 field period (1 vertical period), B track TB, A track TA, B track TB, A track TA, B track TB, and A track TA are reproduced in order. For example, when reproduction is carried out using only A head HA, noise bars are generated on the screen during B track TB reproduction because the azimuth angles do not match. Therefore, reproduction is carried out using A head HA and B' head HB'. The reproduced output of A head HA and the reproduced output of B' head HB' are compared, whereby the reproduced output of the higher level is used. This results in A track TA reproduced by A head HA, and B track TB reproduced by B' head HB'. FIG. 6 (a) shows a head reproduction signal HR in search reproduction of the SP mode.

In this case, it is necessary to change the polarity of the color rotary pulse in accordance with the reproduction of A track TA and B track TB. FIG. 6 (c) shows a color rotary pulse CR. FIG. 6 (b) shows a head switching signal HSW. It can be appreciated that the color rotary pulse CR is not identical to the head switching signal HSW.

Figure 7:
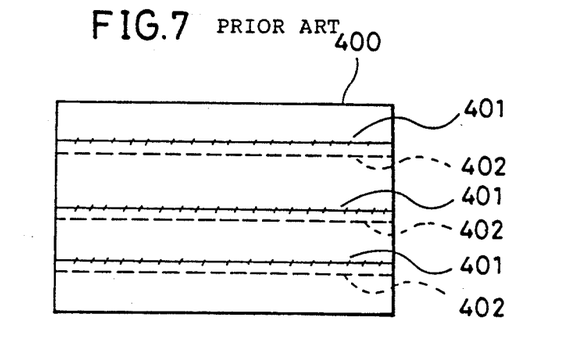
FIG. 7 is a screen in the case where the time constant of the AGC is changed in accordance with the color rotary pulse during search reproduction of the SP mode.

If a time constant switching signal TSW is created in accordance with the edge of the color rotary pulse CR, a plurality of pulses are generated within 1 field, as shown in FIG. 6 (d). If the time constant of the AGC is shortened when the time constant switching signal TSW is at the H level, another plurality of noises 402 due to the change in time constant are generated on screen 400, in addition to a plurality of noise bars 401. This degrades the S/N of the image signal.

In view of the foregoing, the color rotary pulse can not be used for controlling the time constant of the AGC during search reproduction of the SP mode regarding the double azimuth 4 head system VTRs. It is therefore necessary to identify whether the reproduction state of the double azimuth 4 head system VTR is the search reproduction or not of the SP mode.

SUMMARY OF THE INVENTION

An object of the present invention is to identify whether the reproduction state of a double azimuth 4 head system video tape reproduction device is a predetermined high speed reproduction or not.

Another object of the present invention is to identify whether the reproduction state of a VTR is the search reproduction of the SP mode or not and change the time constant of the AGC in accordance with the identification result.

A further object of the present invention is to provide a device and method for identifying the reproduction state of a VTR using the color rotary pulse.

The reproduction mode identification device in accordance with the present invention comprises a reception portion for receiving the specifying signal specifying whether to advance or delay the phase of the reproduced chrominance signal in a phase shift system, and a mode identification circuit responsive to the period of the specifying signal from the reception portion for identifying whether the reproduction state is a predetermined high speed reproduction or not.

The mode identification circuit preferably comprises a counter for counting the pulses of the horizontal synchronizing signal equivalent to a predetermined value smaller than 1 vertical period (vertical synchronizing period), and determination means responsive to the output of the counter to make determination as to whether a half period of the specifying signal is greater than the predetermined value and providing the result as an identification signal.

The determination means comprises an edge detecting circuit responsive to an edge of a specifying signal to provide a first detection signal. The counter may be reset in response to the first detection signal.

A method of reproduction mode identification in accordance with another aspect of the present invention comprises the step of identifying whether the reproduction state is a predetermined high speed reproduction or not in accordance with the period of the specifying signal specifying the advance/delay of the phase of the reproduced chrominance signal in the phase shift system.

In accordance with the present invention, it is possible to identify whether the reproduction state of the video tape reproduction device is a predetermined high speed reproduction or not in accordance with the color rotary pulse.

Therefore, image signals with satisfactory S/N can be obtained by controlling the change of the time constant of the AGC, for example, using the identification result.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 8:
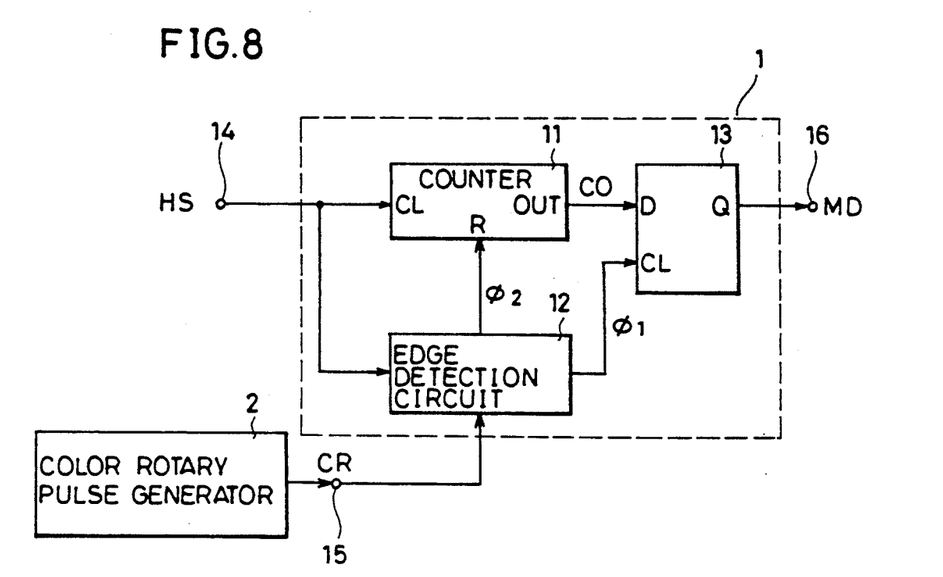
FIG. 8 is a block diagram of a reproduction mode identification circuit according to an embodiment of the present invention.

Referring to FIG. 8, a reproduction mode identification circuit 1 in accordance with the embodiment of the present invention comprises a counter 11, an edge detecting circuit 12, and a D type flipflop 13. Reproduction mode identification circuit 1 comprises an input terminal 14 for receiving the horizontal synchronizing signal HS, an input terminal 15 for receiving the color rotary pulse CR applied from a color rotary pulse generator 2, and an output terminal 16 for providing the mode identification signal MD.

The horizontal synchronizing signal HS from input terminal 14 is provided to clock terminal CL of counter 11, and edge detecting circuit 12. The color rotary pulse CR from input terminal 15 is provided to edge detecting circuit 12. Counter 11 counts the pulses in the horizontal synchronizing signal HS to provide a count signal CO from output terminal OUT. Edge detecting circuit 12 is responsive to the horizontal synchronizing signal HS to provide first and second detection signals $\phi 1$ and $\phi 2$ according to the color rotary pulse CR. The first detection signal $\phi 1$ is applied to clock terminal CL of flipflop 13, whereas the second detection signal $\phi 2$ is applied to reset terminal R of counter 12. A count signal CO is applied to the input terminal D of flipflop 13. The output signal from output terminal Q of flipflop 13 is provided to output terminal 16 as the mode identification signal MD.

Figure 9:
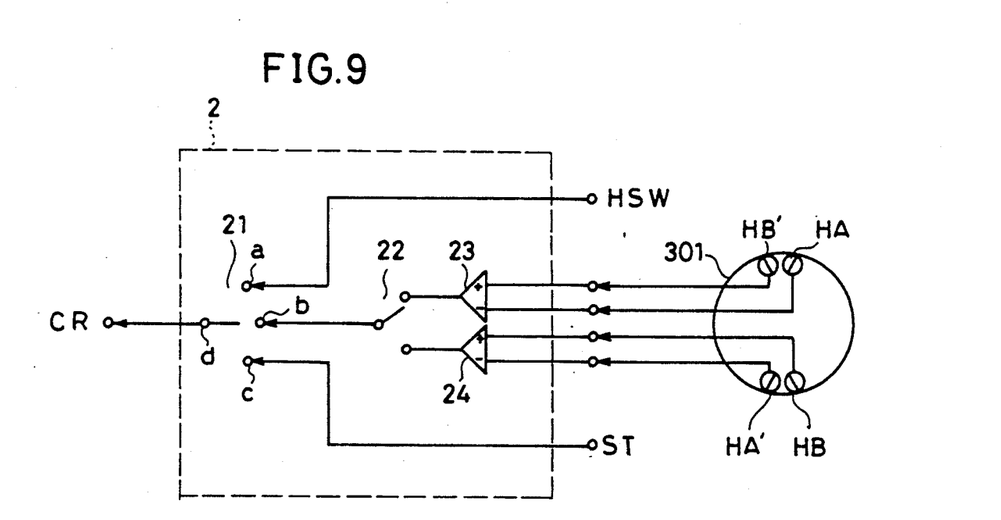
FIG. 9 is an example of a color rotary pulse generator.

The structure of color rotary pulse generator 2 is shown in FIG. 9. Color rotary pulse generator 2 comprises switches 21 and 22, and comparators 23 and 24. The head reproduction signals from A head HA and B' head HB' are applied to the negative input terminal and the positive input terminal of comparator 23, respectively. The head reproduction signals from B head HB and A' head HA' are provided to the positive input terminal and negative input terminal of comparator 24, respectively. The output signals of comparators 23 and 24 are provided to contact b of switch 21 via switch 22. A control signal of 30 Hz, i.e. the head switching signal HSW is provided to contact a of switch 21. A signal ST from a system controller is applied to contact c. The output signal from terminal d of switch 21 is the color rotary pulse CR.

Switch 21 is turned to the side of contact a during standard reproduction of the SP mode, and turned to the contact b side during the search reproduction of the SP mode. During "still reproduction", switch 21 is turned to the contact c side. Thus, color rotary pulse CR is as shown in FIG. 1 (c) at the time of standard reproduction, and is as shown in FIG. 6 (c) at the time of search reproduction. At the time of still reproduction, the same track is traced repeatedly. Signal ST is at the L level at the time of A track reproduction, and at the H level at the time of B track reproduction.

The operation of reproduction mode identification circuit 1 of FIG. 8 will be explained hereinafter with reference to the waveforms of FIGS. 10 and 11.

Figure 10:
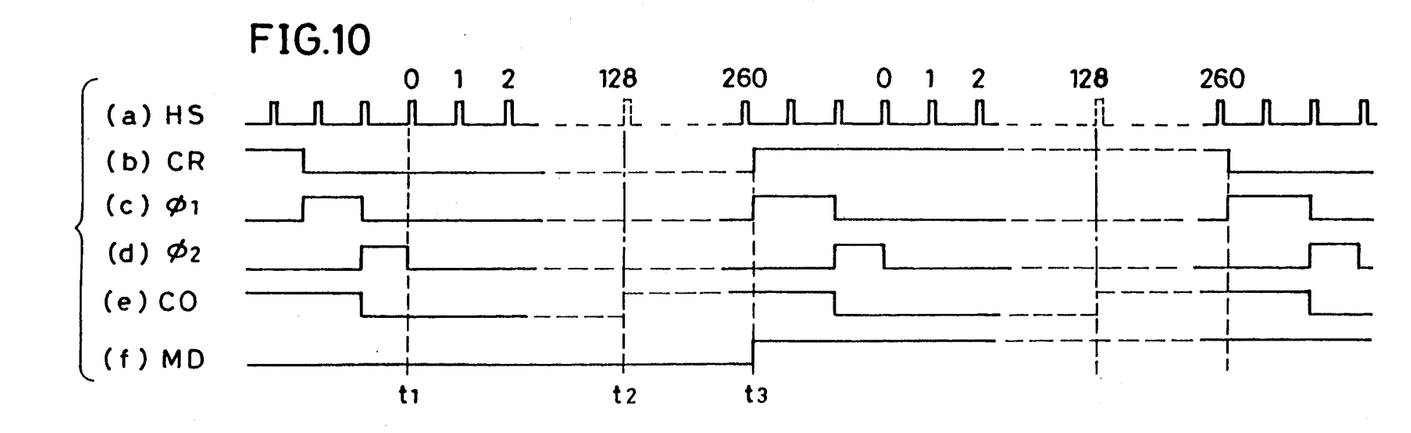
FIG. 10 is a waveform of various signals according to the embodiment of FIG. 8 at the time of standard reproduction of the SP mode.

FIG. 10 shows various signals of a double azimuth 4 head system VTR that occur during standard reproduction. The horizontal synchronizing signal HS is shown in FIG. 10 (a), and the color rotary pulse CR is shown in FIG. 10 (b). The color rotary pulse CR is identical to the normal head switching signal in this case. A half period of this color rotary pulse is equivalent to 262.5H (H is one period of the horizontal synchronizing signal HS).

When the color rotary pulse CR is applied to edge detecting circuit 12, a first detection signal $\phi 1$ in synchronization with the horizontal synchronizing signal HS, and a second detection signal $\phi 2$ having the phase lagging the first detection signal $\phi 1$ are obtained, as shown in (c) and (d) of FIG. 10. When the second detection signal $\phi 2$ attains the H level, counter 11 is reset.

When the second detection signal $\phi 2$ falls down at time point t1, the reset of counter 11 is released, to start the counting of the pulses in the horizontal synchronizing signal HS.

When counter 11 counts 128 pulses at time point t2, the count signal CO attains the H level as shown in FIG. 10 (e).

When the color rotary pulse CR rises at time point t3, the first detection signal $\phi 1$ attains the H level to be applied to clock terminal CL of flipflop 13. As a result, the mode identification signal MD provided from output terminal Q of flipflop 13 becomes H, as shown in FIG. 10 (f). The mode identification signal MD remains at the H level as long as the color rotary pulse CR does not change.

Figure 11:
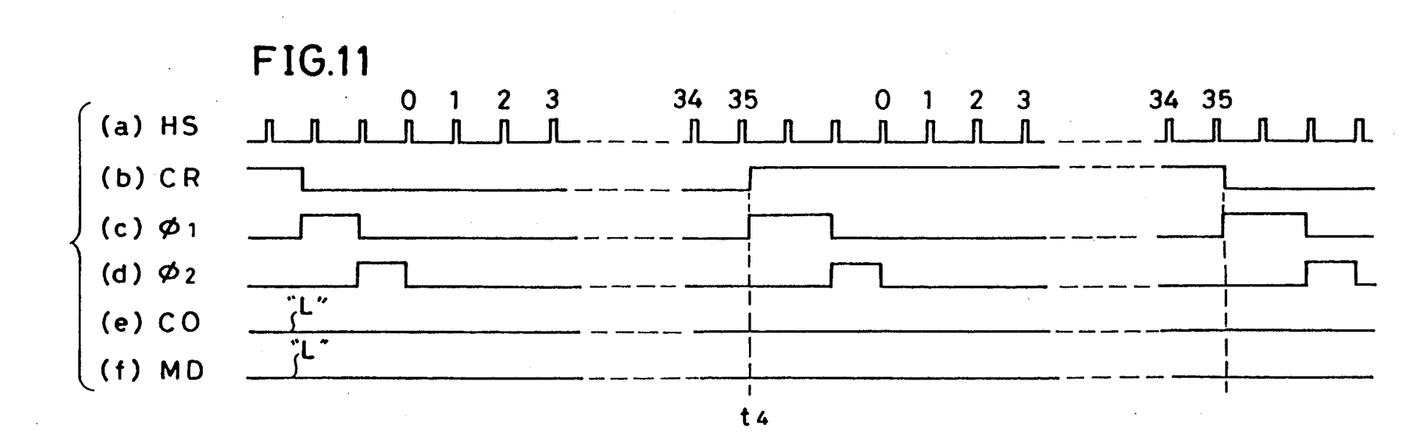
FIG. 11 is a waveform of various signals according to the embodiment of FIG. 8 at the time of search reproduction of the SP mode.

FIG. 11 is a waveform of various signals when the double azimuth 4 head system VTR is operating in the search reproduction state at a high speed of a multiple of 7.

FIG. 11 (a) shows the horizontal synchronizing signal HS, whereas FIG. 11 (b) shows the color rotary pulse CR. A half period of the color rotary pulse CR at this time is equivalent to 37.5H (262.5H/7). As in the above mentioned manner, counter 11 counts the pulses of the horizontal synchronizing signal HS.

After 35 pulses are counted by counter 11, the color rotary pulse CR rises to the H level. This causes the first detection signal $\phi 1$ to rise to the H level, as shown in FIG. 11 (c). The count signal CO provided from counter 11 remains at the L level at this time, as shown in FIG. 11 (e).

Therefore, the mode identification signal MD provided from output terminal Q of flipflop 13 is at the L level, as shown in FIG. 11 (f). The mode identification signal MD remains at this L level as long as the color rotary pulse CR does not change.

Thus, the reproduction state of the VTR can be identified whether it is the search reproduction or the standard reproduction in accordance with the color rotary pulse CR by the reproduction mode identification circuit 1 of FIG. 8.

The count value of counter 11 of FIG. 8 is not limited to 128, and can be a value below 262.5H. However, it is preferable to have some margin considering the dropout of the horizontal synchronizing signal HS.

Figure 12:
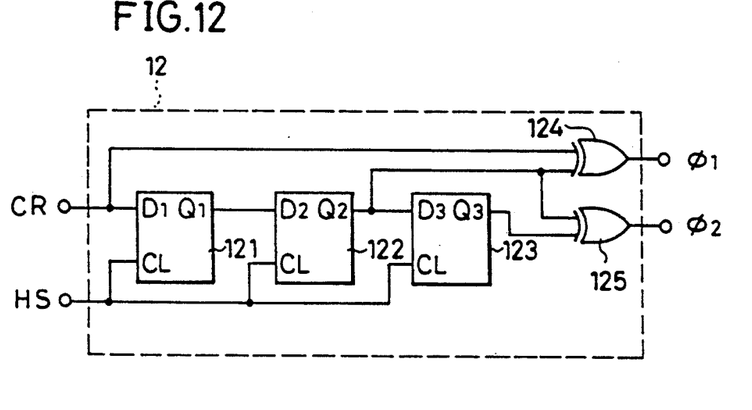
FIG. 12 is an example of a structure of an edge detecting circuit.

FIG. 12 is an example of the edge detecting circuit 12 of FIG. 8. Edge detecting circuit 12 comprises first, second, and third D type flipflops 121, 122, 123, and first and second exclusive OR gates (referred to as an EOR gate hereinafter) 124, 125. The horizontal synchronizing signal HS is applied to the clock terminals CL of flipflops 121, 122 and 123. The color rotary pulse CR is applied to input terminal D1 of the first flipflop 121, and to one input terminal of the first EOR gate 124. The output signal from output terminal Q1 of the first flipflop 121 is provided to input terminal D2 of the second flipflop 122. The output signal from output terminal Q2 of the second flipflop 122 is provided to input terminal D3 of the third flipflop 123, the other input terminal of the first EOR gate 124, and one input terminal of the second EOR gate 125. The output signal from output terminal Q3 of the third flipflop 123 is provided to the other input terminal of the second EOR gate 125. The output signal from the first EOR gate 124 becomes the first detection signal $\phi 1$, whereas the output signal from the second EOR gate 125 becomes the second detection signal $\phi 2$.

Figure 13:
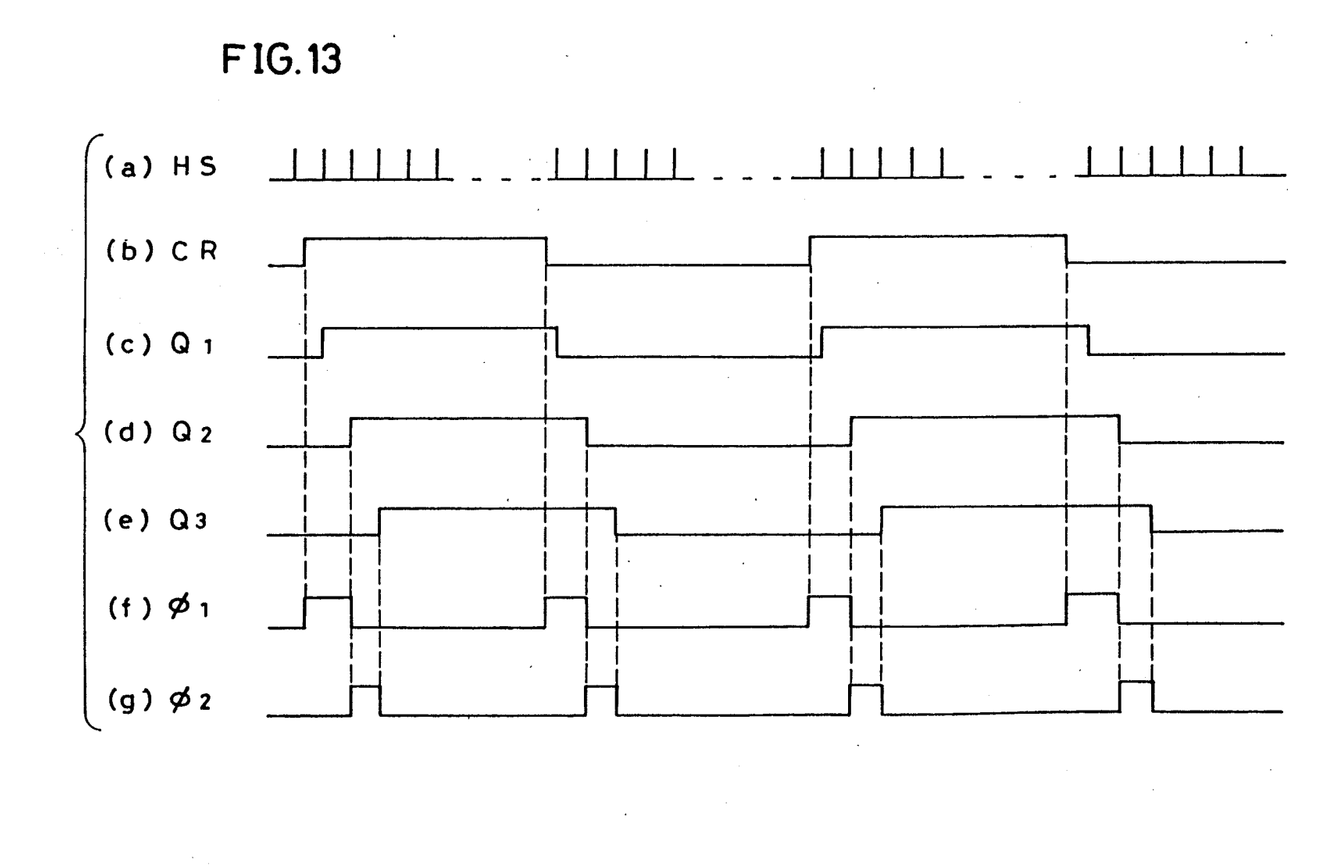
FIG. 13 is a waveform of various signals in the edge detecting circuit.

In accordance with the horizontal synchronizing signal HS of FIG. 13 (a) and the color rotary pulse CR of FIG. 13 (b), the output signals from output terminals Q1–Q3 of flipflops 121–123 are as shown in FIGS. 13 (c), (g), and (e), respectively. The color rotary pulse CR and the output signal from the output terminal Q2 of the second flipflop 122 are applied to the first EOR gate 124, whereby the first detection signal $\phi 1$ of FIG. 13 (f) is obtained. The output signals from output terminal Q2 of the second flipflop 122 and output terminal Q3 of the third flipflop 123 are applied to the second EOR gate 125, whereby the second detection signal $\phi 2$ of FIG. 13 (g) is obtained.

Figure 14:
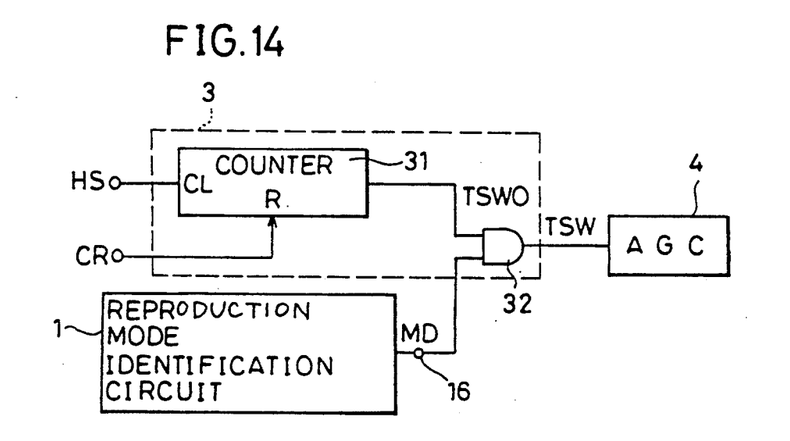
FIG. 14 is an example of a structure of a switching signal generating circuit.

FIG. 14 shows the structure of the switching signal generating circuit 3 responsive to the mode identification signal MD from reproduction mode identification circuit 1 for generating the time constant switching signal TSW. Switching signal generating circuit 3 comprises a counter 31 and an AND gate 32. The horizontal synchronizing signal HS is applied to clock terminal CL of counter 31, whereas the color rotary pulse CR is applied to reset terminal R. The output signal of counter 31 is provided to one input terminal of AND gate 32 as the time constant switching signal TSWO. The mode identification signal MD from reproduction mode identification circuit 1 is provided to the other input terminal of AND gate 32. The output signal of AND gate 32 is provided to AGC circuit 4 as the time constant switching signal TSW.

Figure 15:
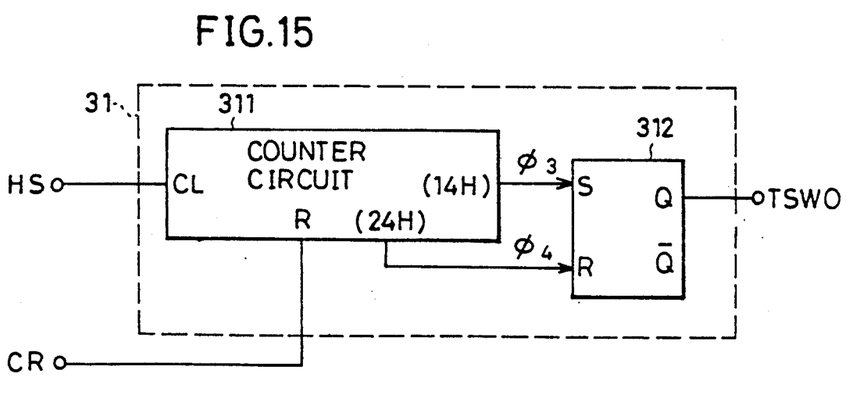
FIG. 15 is an example of a structure of a counter in the switching signal generating circuit.

FIG. 15 shows the structure of counter 31 of FIG. 14 in detail. Counter 31 comprises a counter circuit 311 and a RS type flipflop 312.

Counter circuit 311 counts the pulses of the horizontal synchronizing signal HS. Counter circuit 311 is responsive to the color rotary pulse CR to carry out reset and release. When the reset of counter circuit 311 is released in response to the color rotary pulse CR, counter circuit 311 counts the pulses of the horizontal synchronizing signal HS. When counter circuit 311 counts a number of pulses corresponding to 14H, signal φ3 is generated. Furthermore, when a number of pulses corresponding to 24H are counted, signal φ4 is generated. Flipflop 312 is set in response to signal φ3, and reset in response to signal φ4. Accordingly, the time constant switching signal TSWO provided from output terminal Q of flipflop 312 attains the H level after a period of 14H from the release of the reset, and then attains the L level after a period of 10H.

When the mode identification signal MD provided from reproduction mode identification circuit 1 of FIG. 14 is at the H level, a pulse having the width of 10H passes AND gate 32 to be provided to AGC circuit 4 as the time constant switching signal TSW. In response to the time constant switching signal TSW of the H level, the time constant of AGC circuit 4 is shortened.

When the mode identification signal MD is at the L level, the time constant switching signal TSW provided from AND gate 32 is at the L level. The time constant of AGC circuit 4 is therefore not changed.

The time constant of the AGC circuit 4 is shortened in response to the time constant switching signal TSW of the H level during standard reproduction of the SP mode. During search reproduction of the SP mode, the time constant of AGC circuit 4 is not changed.

Figure 16:
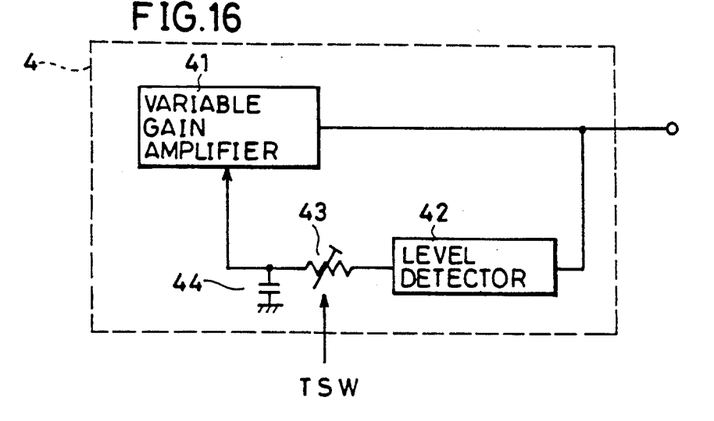
FIG. 16 is an example of a structure of a AGC circuit.

As shown in FIG. 16, AGC circuit 4 comprises a variable gain amplifier 41, a level detector 42, a capacitor 44, and a variable resistor 43. The time constant switching signal TSW is applied to variable resistor 43. When the time constant switching signal TSW is at the H level, the time constant of AGC circuit becomes shorter. When the time constant switching signal TSW is at the L level, the time constant of AGC circuit 4 becomes longer.

Figure 17:
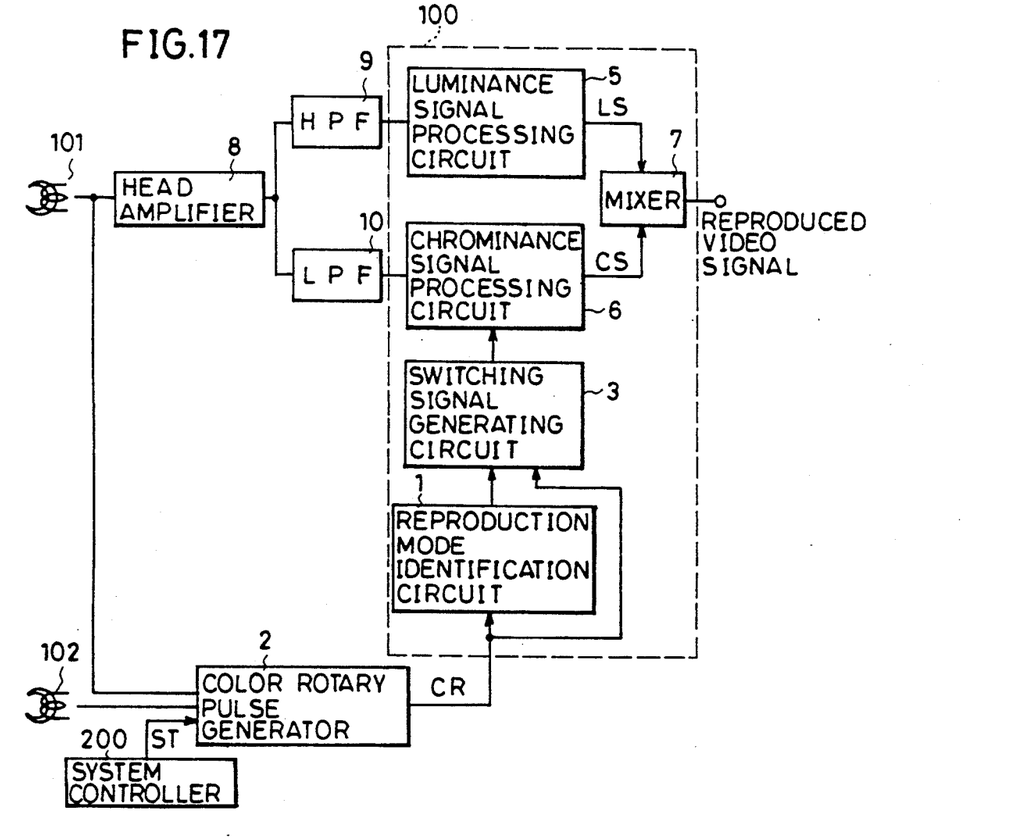
FIG. 17 is a block diagram showing the components of the VTR employing the reproduction mode identification circuit of FIG. 8.

FIG. 17 is a block diagram of the components of a VTR employing the reproduction mode identification circuit 1 and the switching signal generating circuit 3.

The head reproduction signals from video head 101 including A head, B head, A′ head and B′ head are provided to head amplifier 8 and color rotary pulse generator 2. The output of head amplifier 8 is provided to a luminance signal processing circuit 5 via a high pass filter 9, and also to a chrominance signal processing circuit 6 via a low pass filter 10. The reproduced luminance signal LS from luminance signal processing circuit 5 and the reproduced chrominance signal CS from chrominance signal processing circuit 6 are provided to a mixer 7. The reproduced image signal is obtained from mixer 7.

The control signal from control head 102 and signal ST from a system controller 200 are provided to color rotary pulse generator 2. The color rotary pulse CR obtained from color rotary pulse generator 2 is provided to reproduction mode identification circuit 1. The mode identification signal obtained in reproduction mode identification circuit 1 is provided to switching signal generating circuit 3. The time constant switching signal obtained by switching signal generating circuit 3 is provided to chrominance signal processing circuit 6.

The circuit portion 100 comprising luminance signal processing circuit 5, chrominance signal processing circuit 6, mixer 7, switching signal generating circuit 3, and reproduction mode identification circuit 1 are incorporated in one IC.

Figure 18:
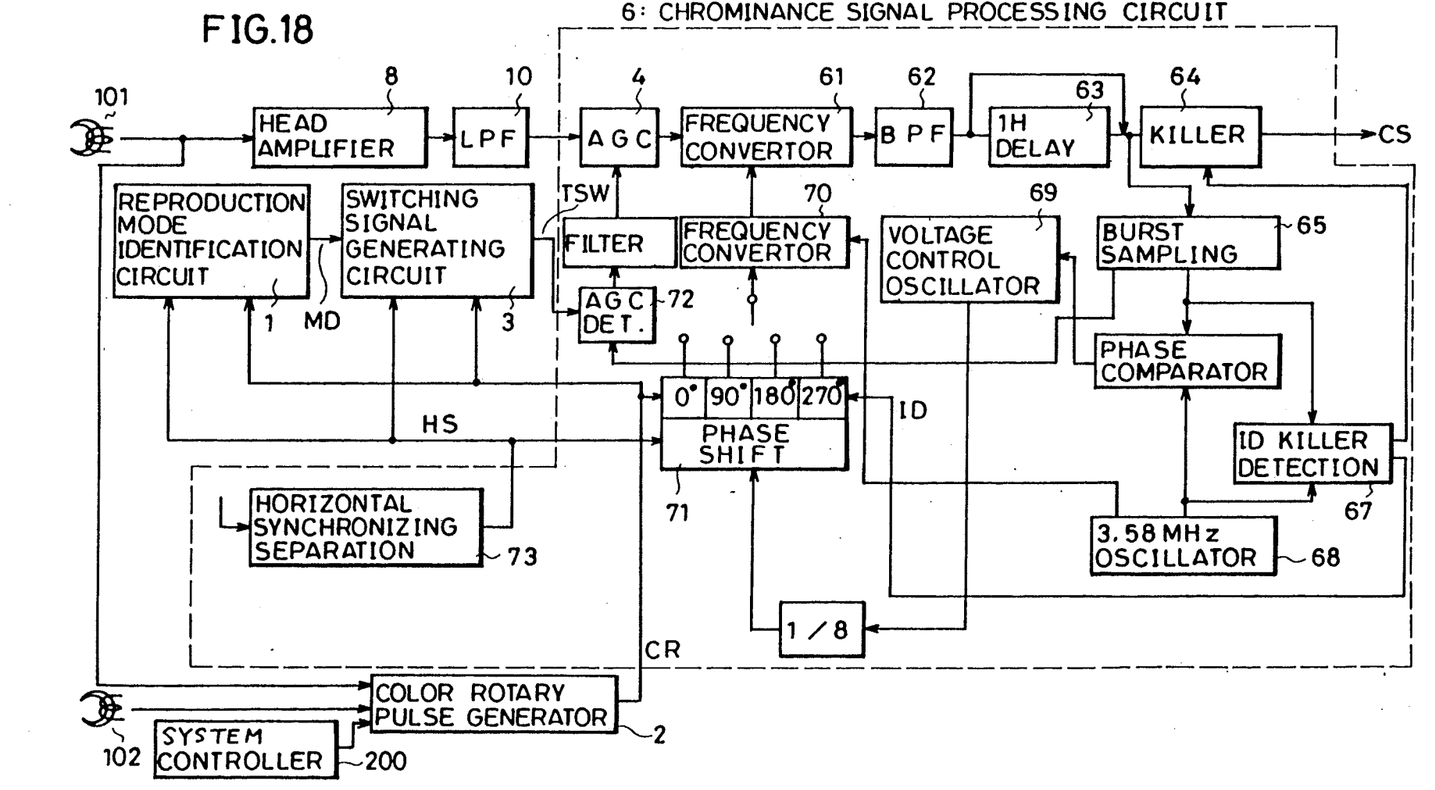
FIG. 18 is a block diagram showing the structure of the components of the VTR of FIG. 17 in detail.

FIG. 18 is a diagram showing the components of FIG. 17 in detail. The reproduced chrominance signal from low pass filter 10 is provided as the reproduced chrominance signal CS via AGC circuit 4, a frequency converter 61, a bandpass filter 62, a 1H delay circuit 63, and a killer circuit 64. The output of 1H delay circuit 63 is provided to a burst sampling circuit 65. The output of burst sampling circuit 65 is provided to a phase comparator 66 and an ID killer detecting circuit 67. The output of a 3.58 MHz oscillator 68 is provided to phase comparator 66 and ID killer detecting circuit 67. The output of phase comparator 66 is provided to a $320f_H$ voltage control oscillator 69. The output of oscillator 69 is frequency divided to ¼ and provided to phase shift circuit 71. The output of ID killer detecting circuit 67 is provided to killer circuit 64 and a phase shift circuit 71.

Meanwhile the time constant switching signal TSW provided from switching signal generating circuit 3 is provided to AGC detector 72. A horizontal synchronization separation circuit 73 separates the horizontal synchronizing signal HS from the reproduced luminance signal and provides the output to reproduction mode identification circuit 1, switching signal generating circuit 3, and phase shift circuit 71.

The color rotary pulse CR provided from color rotary pulse generator 2 is provided to reproduction mode identification circuit 1, switching signal generating circuit 3, and phase shift circuit 71. The output of phase shift circuit 71 is provided to frequency converter 70. The output of frequency converter 70 is provided to frequency converter 61. Phase shift circuit 71 advances or delays the phase of the reproduced chrominance signal by 90° in accordance with the color rotary pulse CR.

In the VTR of FIGS. 17 and 18, identification is made whether the reproduction state is the standard reproduction of the SP mode or the search reproduction of the SP mode. Accordingly the color rotary pulse CR is used to change the time constant of the AGC circuit. Thus, image signals with satisfactory S/N are obtained. Also, it is not necessary to provide pins in the IC forming the circuit portion 100 of FIG. 17 for receiving the head switching signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a video tape reproduction device for reproducing a prerecorded signal from a video tape, a reproduction mode identification device for identifying whether a reproduction state of the video tape reproduction device is in a high speed reproduction mode or not; said prerecorded signal comprising a chrominance signal having a period and a horizontal synchronizing signal having a period; wherein said chrominance signal has signal phases periodically shifted a predetermined amount in one or another direction relative to the phase of said chrominance signal during an immediately preceding period; said chrominance signal phase shift occurring during each horizontal synchronizing signal period; wherein said video tape reproduction device further comprises: a phase shift circuit for phase-shifting, in response to the period of said horizontal synchronizing signal reproduced by said video tape reproduction device, said chrominance signal phase as the chrominance signal is reproduced by said video tape reproduction device; and a specifying signal generation circuit for generating a specifying signal for specifying a phase-shifting direction for said phase shift circuit during prerecorded signal reproduction, wherein said specifying signal has a period; said reproduction mode identification device comprising:

reception means connected to said specifying signal generation circuit for receiving said specifying signal, and mode identification means connected to said reception means for identifying whether said reproduction state of said video tape reproduction device is said high speed reproduction mode or not as defined by the period of said specifying signal.

2. The reproduction mode identification device according to claim 1, wherein said horizontal synchronizing signal comprises a series of periodic pulses and wherein said mode identification means comprises:

counting means for counting the pulses of said horizontal synchronizing signal and for generating an output when said pulse count is equivalent to a predetermined period smaller than one vertical period, and determination means responsive to the output of said counting means for determining whether a half period of said specifying signal is greater than said predetermined period or not and providing the result as an identification signal for identifying whether said reproduction state of said video tape reproduction device is said high speed reproduction mode or not.

3. The reproduction mode identification device according to claim 2, wherein said determination means comprises detection signal generating means responsive to an of said specifying signal for generating a first detection signal, said counting means is reset in response to said first detection signal.

4. The reproduction mode identification device according to claim 3, wherein said detection signal generating means further generates a second detection signal in response to the edge of said specifying signal, said first detection signal having a phase lagging said second detection signal, said determination means further comprises a first signal holding means responsive to said second detection signal for holding and providing the output signal of said counting means.

5. The reproduction mode identification device according to claim 4, wherein said detection signal generating means comprises:

a second signal holding means responsive to said horizontal synchronizing signal for holding and providing said specifying signal, third signal holding means responsive to said horiziontal synchronizing signal for holding and providing the output signal of said second signal holding means, fourth signal holding means responsive to said horizontal synchronizing signal for holding and providing the output signal of said third holding means, first exclusive OR means for carrying out exclusive OR operation of said specifying signal and the output signal of said third signal holding means to provide the result as said first detection signal, and second exclusive OR means for carrying out exclusive OR operation of said output of said third signal holding means and the output signal of said fourth signal holding means to provide the result as said second detection signal.

6. The reproduction mode identification device according to claim 1 wherein said high speed reproduction mode comprises the search reproduction of the standard play mode.

7. The reproduction mode identification device according to claim 1, wherein said video tape reproduction device comprises a double azimuth four head system video tape reproduction device.

8. The reproduction mode identification device according to claim 1, wherein said specifying signal comprises a color rotary pulse specifying whether to advance or delay the phase of the reproduced chrominance signal by 90°.

9. In a video tape reproduction device having a double azimuth four-head system for reproducing a video signal including a chrominance signal having a phase and magnitude, said reproduction device including an automatic gain control circuit for controlling the magnitude of said chrominance signal and a phase shift system for phase shifting the phase of said chrominance signal, a device for switching a time constant of the automatic gain control circuit, said device comprising:

mode identification means for receiving a specifying signal, generated by said phase shift system and having a period, which specifies whether to advance or delay the phase of the reproduced chrominance signal, said period of said specifying signal being indicative of whether a reproduction state of said video tape reproduction device is a high speed reproduction mode or not, and switching signal generating means for generating a switching signal for a predetermined time period to alter the time constant of said automatic gain control circuit, said switching signal being generated in response to said mode identification means indicating that said reproduction state is a reproduction mode other than said high speed reproduction mode.

10. The device according to claim 9, wherein said video signal further includes a horizontal synchronizing signal comprising a series of periodic pulses and wherein said mode identification means comprises:

counting means for counting the pulses of said horizontal synchronizing signal and for generating an output when said pulse count is equivalent to a predetermined period smaller than one vertical period, and determination means responsive to the output of said counting means for determining whether a half period of said specifying signal is greater than said predetermined period or not and providing the result as an identification signal for identifying whether said reproduction state of said video tape reproduction device is said high speed reproduction mode or not.

11. The device according to claim 10, wherein said determination means comprises detection signal generating means responsive to an edge of said specifying signal for generating a first detection signal, said counting means is reset in response to said first detection signal.

12. The device according to claim 11, wherein said detection signal generating means further generates a second detection signal in response to the edge of said specifying signal, said first detection signal having a phase lagging said second detection signal, said determination means further comprises a first signal holding means responsive to said second detection signal for holding and providing the output signal of said counting means.

13. A video tape recorder having a double azimuth four-head system and a phase shift system for reproducing a video signal recorded on a video tape, said video signal including a chrominance signal having a phase and a magnitude, said video tape recorder comprising:

video signal detecting means for tracing first and second tracks recorded alternately on said video tape and for detecting said video signal recorded on said first and second tracks, control signal detecting means for tracing a control track recorded on said video tape and for detecting a control signal recorded on said control track, specifying signal generating means, connected to said video signal detecting means and said control signal detecting means, for generating, in response to said video signal or said control signal, a specifying signal having a period to specify whether to advance or delay the phase of the chrominance signal, automatic gain control means, connected to said video signal detecting means, for controlling the magnitude of the chrominance signal, adjusting means, connected to said automatic gain control means, for adjusting a time constant of said automatic gain control means in response to a switching signal, phase shift means, connected to said specifying signal generating means and responsive to said specifying signal, for shifting the phase of said chrominance signal, mode identification means, connected to said specifying signal generating means, for identifying, in response to said period of said specifying signal, whether the reproduction state of said video tape recorder is a high speed reproduction mode or not, and switching signal generating means, connected to said adjusting means, for generating said switching signal for a predetermined time period to alter the time constant of said automatic gain control means, said switching signal being generated in response to said mode identification means indicating that said reproduction state is a reproduction mode other than said high speed reproduction mode.

14. The video tape recorded according to claim 13, further comprising horizontal synchronizing signal generating means for generating said horizontal synchronizing signal comprising a series of periodic pulses, wherein said mode identification means comprises:

counting means for counting the pulses of said horizontal synchronizing signal and for generating an output when said pulse count is equivalent to a predetermined period smaller than 1 vertical period, and determination means responsive to the output of said counting means for determining whether a half period of said specifying signal is greater than said predetermined period or not and providing the result as an identification signal for identifying whether said reproduction state of said video tape reproduction device is said high speed reproduction mode or not.

15. The video tape recorder according to claim 14, wherein said switching signal generating means comprises pulse generating means responsive to said specifying signal and said horizontal synchronizing signal for generating a predetermined pulse, and logic means for providing said pulse as said switching signal, when said identification signal indicates a reproduction mode other than said high speed reproduction mode.

16. The video tape recorder according to claim 15, wherein said pulse generating means comprises a counter circuit to receive a vertical synchronizing signal for providing a first signal when counting a first number of pulses and providing a second signal when further counting a second number of pulses of said vertical synchronizing signal, and flipflop means set in response to said first signal, and reset in response to said second signal.

* * * * *